United States Patent
Hamada et al.

(10) Patent No.: US 9,611,524 B2
(45) Date of Patent: Apr. 4, 2017

(54) HIGH-YIELD-RATIO HIGH-STRENGTH STEEL SHEET HAVING EXCELLENT WORKABILITY

(71) Applicant: Kobe Steel, Ltd., Kobe-shi (JP)

(72) Inventors: Kazuyuki Hamada, Kakogawa (JP); Tatsuya Asai, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 758 days.

(21) Appl. No.: 13/800,561

(22) Filed: Mar. 13, 2013

(65) Prior Publication Data
US 2013/0273391 A1 Oct. 17, 2013

(30) Foreign Application Priority Data
Mar. 30, 2012 (JP) .................. 2012-082589

(51) Int. Cl.
*C22C 38/04* (2006.01)
*C22C 38/38* (2006.01)
(Continued)

(52) U.S. Cl.
CPC ............ *C22C 38/38* (2013.01); *B32B 15/013* (2013.01); *C21D 6/007* (2013.01); *C21D 9/46* (2013.01);
(Continued)

(58) Field of Classification Search
CPC ......... C22C 38/02; C22C 38/04; C22C 38/06; C22C 38/12; C22C 38/14; C22C 38/22; C22C 38/38
See application file for complete search history.

(56) References Cited

U.S. PATENT DOCUMENTS 7,553,380 B2 * 6/2009 Ikeda .................. C21D 8/0226
148/320
2003/0063996 A1 4/2003 Funakawa et al.
(Continued)

FOREIGN PATENT DOCUMENTS

JP 55-122820 9/1980
JP 6-108152 A 4/1994
(Continued)

OTHER PUBLICATIONS

U.S. Appl. No. 13/690,552, filed Nov. 30, 2012, Hamada, et al.
(Continued)

*Primary Examiner* — Roy King
*Assistant Examiner* — Jophy S Koshy
(74) *Attorney, Agent, or Firm* — Oblon, McClelland, Maier & Neustadt, L.L.P.

(57) ABSTRACT

A steel sheet according to the present invention has tensile strength of 980 MPa or more, exerts a high-yield ratio, and has excellent workability (in detail, strength-ductility balance). The steel sheet contains: C: 0.06-0.12% (excluding 0.12%); Si: 0.2% or less; Mn: 2.0-3.5%; at least one element selected from the group consisting of Ti, Nb, and V of 0.01-0.15% in total; B: 0.0003-0.005%; P: 0.05% or less; S: 0.05% or less; Al: 0.005-0.1%; N: 0.015% or less; and the balance is iron and unavoidable impurities, in which the content of ferrite is more than 5% to 15% or less, that of martensite is 25-55%, and the total content of bainite and tempered martensite is 30% or more to less than 70%, based on the whole microstructure, and in which the average crystal grain size of the ferrite is 3.0 μm or less.

11 Claims, 1 Drawing Sheet

(51) Int. Cl.

| | |
|---|---|
| *C22C 38/32* | (2006.01) |
| *C22C 38/28* | (2006.01) |
| *C22C 38/22* | (2006.01) |
| *C22C 38/14* | (2006.01) |
| *C22C 38/12* | (2006.01) |
| *C22C 38/06* | (2006.01) |
| *C22C 38/02* | (2006.01) |
| *C22C 38/00* | (2006.01) |
| *B32B 15/01* | (2006.01) |
| *C23C 2/06* | (2006.01) |
| *C21D 9/46* | (2006.01) |
| *C21D 6/00* | (2006.01) |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/28* (2013.01); *C22C 38/32* (2013.01); *C23C 2/06* (2013.01); *Y10T 428/12799* (2015.01)

(56) References Cited

U.S. PATENT DOCUMENTS

| | | |
|---|---|---|
| 2004/0074573 A1 | 4/2004 | Funakawa et al. |
| 2010/0307644 A1 | 12/2010 | Gil Otin et al. |
| 2013/0017411 A1* | 1/2013 | Hamada ............... C21D 8/0236 428/659 |

FOREIGN PATENT DOCUMENTS

| | | | |
|---|---|---|---|
| JP | 2001-220641 | 8/2001 | |
| JP | 2002-322539 | 11/2002 | |
| JP | 2007-9317 A | 1/2007 | |
| JP | 2007-231369 | 9/2007 | |
| JP | WO 2011125738 A1 * | 10/2011 | ........... C21D 8/0236 |
| KR | 10-2010-0016438 A | 2/2010 | |
| WO | WO 2011/125738 A1 | 10/2011 | |

OTHER PUBLICATIONS

Fan Dong-Li, et al., "Heat Treatment Engineering Notes", Second edition, 2005, 5 pages (with English Translation).
Wang Zhong-Cheng, et al., "500 Questions about Steel Heat Treatment", 2009, 5 pages (with English Translation).

* cited by examiner

HIGH-YIELD-RATIO HIGH-STRENGTH STEEL SHEET HAVING EXCELLENT WORKABILITY

BACKGROUND OF THE INVENTION

1. Field of the Invention

The present invention relates to a high-yield-ratio high-strength steel sheet (cold-rolled steel sheet, hot-dip galvanizing-coated steel sheet, and hot-dip galvannealing-coated steel sheet), and in particular, to a high-strength steel sheet having tensile strength of 980 MPa or more, in which a yield ratio is enhanced without a decrease in workability.

A steel sheet according to the present invention can be preferably used in: automotive structural members each of which is required to have high-workability and a high-yield ratio (e.g., body skeleton members such as a side sill, pillar, member, and reinforce; and reinforcement members such as a bumper, door guard bar, seat part, and suspension part); home appliance members; and the like.

2. Description of the Related Art

With the growing consciousness of global environmental problems, each automotive manufacturer has recently been promoting weight saving of car bodies for the purpose of increasing fuel consumption. Further, from the viewpoint of the safety of occupants, the crash safety standards of vehicles are tightened and the durability of a member against an impact is also required. Accordingly, the use ratio of high-strength steel sheets has been further increased in recent vehicles. For example, in car body skeleton members and reinforce members each of which is required to have a rust-prevention property, hot-dip galvanizing-coated steel sheets and hot-dip galvannealing-coated steel sheets (hereinafter, sometimes represented by coated steel sheets) having high-strength are positively adopted.

The aforementioned steel sheets are required to have excellent spot weldability, excellent workability, and an energy absorption ability upon crash, and also required to have high-yield strength, i.e., a high-yield ratio.

From the viewpoint of increasing spot weldability, a reduction in the amount of C is effective, and, for example, in Japanese Unexamined Patent Publication No. 2007-231369, a steel sheet in which the amount of C is remarkably reduced to less than 0.1% is used. However, if the amount of C is reduced, the steel sheet has low-yield strength while having excellent workability, such as ductility, thereby causing the problem that high-yield strength and workability cannot be achieved together.

In addition, in Japanese Unexamined Patent Publication No. 2002-322539, a thin steel sheet is disclosed which contains C of less than 0.10%, is substantially made of both a matrix having a ferrite single phase microstructure and fine precipitates each having a grain size of less than 10 nm dispersed in the matrix, has tensile strength of 550 MPa or more, and has excellent press formability. According to the example in Japanese Unexamined Patent Publication No. 2002-322539, however, the tensile strength of the thin steel sheet is at most approximately 810 to 856 MPa, and it is not disclosed that even a high-strength steel sheet having tensile strength of 980 MPa or more can be made to have both high-yield strength and excellent workability.

On the other hand, an example of a steel sheet having both high-strength and workability includes a dual-phase steel sheet (DP steel sheet) whose major components are ferrite having high-elongation and martensite exerting high-strength. In the DP steel sheet, however, only a low yield ratio can be obtained, and hence a high-yield ratio and high-workability cannot be achieved together. As the aforementioned DP steel sheet, high-strength hot-dip galvanizing-coated steel sheets each having excellent strength-ductility balance are disclosed in, for example, Japanese Unexamined Patent Publications Nos. Sho 55 (1980)-122820 and 2001-220641. In these methods, however, martensite is generated in a cooling step after a hot-dip galvanizing-coating treatment or an alloying treatment, and mobile dislocation is introduced in the ferrite during the martensite transformation, and hence yield strength becomes low.

SUMMARY OF THE INVENTION

The present invention has been made in view of these situations, and an object of the invention is to provide a steel sheet: having tensile strength of 980 MPa or more; exerting a high-yield ratio; and having excellent workability (in detail, strength-ductility balance).

A steel sheet according to the present invention, in which the aforementioned challenge can be achieved, includes: C of 0.06% (meaning 0.06% by mass, hereinafter, the same in chemical component compositions) or more to less than 0.12%; Si of 0.2% or less; Mn of 2.0 to 3.5%; at least one element selected from the group consisting of Ti, Nb, and V of 0.01 to 0.15% in total; B of 0.0003 to 0.005%; P of 0.05% or less; S of 0.05% or less; Al of 0.005 to 0.1% or less; N of 0.015% or less; and the balance being iron and unavoidable impurities, wherein the content of ferrite is more than 5% to 15% or less, that of martensite is 25 to 55%, and the total content of bainite and tempered martensite is 30% or more to less than 70%, based on the whole microstructure, wherein the average crystal grain size of the ferrite is 3.0 μm or less, and wherein tensile strength is 980 MPa or more.

The steel sheet may further include, as another element, at least one element selected from the group consisting of Cr and Mo of 1.0% or less in total (not including 0%). A hot-dip galvanizing-coated layer or a hot-dip galvannealing-coated layer may be provided on the surface of the steel sheet. A high-yield-ratio high-strength hot-dip galvanizing-coated steel sheet and a high-yield-ratio high-strength hot-dip galvannealing-coated steel sheet are encompassed by the invention.

According to the present invention, the basic composition of the microstructures is made of ferrite, martensite, bainite and tempered martensite; the area ratio of the ferrite, that of the martensite, and the total area ratio of the bainite and the tempered martensite are respectively and appropriately controlled; and the average crystal grain size of the ferrite is appropriately controlled, and hence a steel sheet can be obtained which has tensile strength of 980 MPa or more, a high-yield ratio (yield strength/tensile Strength×100=68% or more), and excellent workability (tensile strength×total elongation=10.0 GPa·% or more).

DETAILED DESCRIPTION OF THE INVENTION

The present invention relates to a steel sheet having high-strength of 980 MPa or more and having all properties of high-yield ratio and high-workability, on the premise that the amount of C is within a low C range of less than 0.12%, from the viewpoint of increasing spot weldability. The outline of the development, through which the aforementioned composition requirements have been reached, is as follows:

As stated above, it is desirable that the amount of C is reduced from the viewpoint of increasing spot weldability; however, in such steel sheets having a low amount of C, a steel sheet having high-strength of 980 MPa or more and having both high-yield strength and good workability is not disclosed. On the other hand, an example of the steel sheet having both strength and workability includes a DP steel sheet whose major components are ferrite and martensite; however the DP steel sheet has low-yield strength, because mobile dislocation is introduced in the ferrite during the martensite transformation.

Accordingly, the present inventors have developed a basic idea in which, in a steel sheet having a low amount of C of less than 0.12%, a high-yield ratio may be achieved by replacing part of the ferrite and the martensite in a conventional DP steel sheet with bainite and tempered martensite to make a steel sheet having a mixed microstructure of the ferrite, the martensite, the bainite, and the tempered martensite.

However, because the amount of ferrite becomes relatively small when bainite and tempered martensite are introduced in a DP steel sheet whose major components are ferrite and martensite, the ductility (total elongation) is likely to be decreased; and because the amount of martensite becomes relatively small, the strength is likely to be decreased. In addition, when the fraction of ferrite based on the whole microstructure is too small, the strength-ductility balance is decreased, thereby deteriorating the workability. Conversely, when the fraction of ferrite is too large, it becomes difficult to achieve high-strength and a high-yield ratio.

Further, when the fraction of martensite based on the whole microstructure is too small, the strength is likely to be decreased, and conversely, when the fraction of martensite becomes large, the workability (strength-ductility balance) is deteriorated.

Accordingly, in order to achieve all properties of high-strength, high-yield ratio, and high-workability, the present inventors have intensively studied about the area ratio of ferrite, that of martensite, and the total area ratio of bainite and tempered martensite. As a result, the inventors have succeeded in determining an optimal range of the fraction of each of these microstructures and succeeded in securing high-strength and high-workability.

In addition, the inventors have further improved the workability (strength-ductility balance) by fining the average crystal grain size of the ferrite, thereby completing the present invention.

In the present specification, the "having excellent workability" means that having excellent strength-ductility balance in a high-strength region in which tensile strength is 980 MPa or more. Specifically, it means that, in the aforementioned high-strength region, it is satisfied that tensile strength (TS: unit is MPa)×total elongation (EL: unit is %)=$10.0 \times 10^3$ MPa·% (=10.0 GPa·%) or more is satisfied. It is preferable that TS×EL is 10.5 GPa·% or more.

Also, in the present specification, the "high-yield ratio" means that a yield ratio (YR) represented by "yield strength (YS)/tensile strength (TS)×100" is 68% or more. It is preferable that YR is 70% or more.

Examples of the steel sheet according to the present invention include a cold-rolled steel sheet, a hot-dip galvanizing-coated steel sheet (GI steel sheet), and a hot-dip galvannealing-coated steel sheet (GA steel sheet). In the specification, among the aforementioned steel sheets, the hot-dip galvanizing-coated steel sheet and the hot-dip galvannealing-coated steel sheet are collectively and simply represented by a "coated steel sheet" in some cases.

Hereinafter, the composition requirements of the steel sheet according to the present invention will be described.

A microstructure by which the present invention is characterized will be first described in detail. The microstructure of the steel sheet according to the present invention includes ferrite, martensite, bainite, and tempered martensite, and may further include a balance microstructure excluding ferrite, martensite, bainite, and tempered martensite. As stated later, however, the bainite and the tempered martensite cannot be distinguished from each other by observation using a scanning electron microscope. As long as the fraction of each microstructure, which will be described in detail below, is satisfied, the steel sheet according to the present invention may: (a) be formed of ferrite, martensite, bainite, and tempered martensite; and (b) further include, in addition to the four microstructures, a balance microstructure excluding ferrite, martensite, bainite, and tempered martensite. Both the aspects are encompassed by the invention.

[Fraction of Ferrite: More Than 5% by Area to 15% by Area or Less]

Ferrite is a microstructure that contributes to an improvement in the elongation property of a steel sheet. If the fraction of ferrite based on the whole microstructure is 5% by area or less, the elongation of the steel sheet is decreased, thereby deteriorating the strength-ductility balance. Accordingly, the fraction of ferrite based on the whole microstructure is made to be more than 5% by area, preferably 6% by area or more, and more preferably 7% by area or more. However, if the fraction of ferrite based on the whole microstructure is more than 15% by area, the tensile strength and yield ratio of the steel sheet are decreased. Accordingly, the fraction of ferrite based on the whole microstructure is made to be 15% by area or less, preferably 14% by area or less, and more preferably 13% by area or less.

[Fraction of Martensite: 25 to 55% by Area]

Martensite is a microstructure required for securing high-strength. In the present invention, the fraction of martensite based on the whole microstructure is made to be 25% by area or more, preferably 27% by area or more, and more preferably 30% by area or more. However, if the fraction of martensite becomes too large, the elongation is decreased, thereby deteriorating the workability (strength-ductility balance). In addition, the total fraction of bainite and tempered martensite may become too small, and hence there are sometimes the cases where an action of improving a high-yield ratio is not effectively exerted. Accordingly, the fraction of martensite based on the whole microstructure is made to be 55% by area or less, preferably 52% by area or less, and more preferably 49% by area or less.

[Total Fraction of Bainite and Tempered Martensite: 30% by Area or More to Less Than 70% by Area]

Bainite and tempered martensite are microstructures that contribute to an improvement in a yield ratio. Accordingly, the total fraction of bainite and tempered martensite based on the whole microstructure is made to be 30% by area or more, preferably 33% by area or more, and more preferably 36% by area or more. In order to exert the above actions by the aforementioned ferrite and martensite, the upper limit of the total fraction of bainite and tempered martensite based on the whole microstructure is made to be less than 70% by area. The total fraction of bainite and tempered martensite based on the whole microstructure can be appropriately controlled in accordance with the composition of the microstructure, but the total fraction thereof is made to be preferably 67% by area or less, and more preferably 64% by area or less.

Herein, each of the bainite and tempered martensite has a microstructure in which a carbide is precipitated in the ferrite and it is difficult to distinguish them from each other by observation using a scanning electron microscope, and hence the bainite and tempered martensite are collectively specified by a total amount in the present invention.

In the present invention, one of the amount of the martensite and the total amount of the bainite and the tempered martensite may be larger than the other, and as long as the fraction of each microstructure specified in the invention is satisfied, each of the aspects of: martensite>bainite+tempered martensite, martensite=bainite+tempered martensite, and martensite<bainite+tempered martensite may be included. However, when strength-elongation balance, etc., is taken into consideration, the aspect of martensite<bainite+tempered martensite is preferred.

[Fraction of Balance Microstructure: 5% by Area or Less (Including 0% by Area)]

The steel sheet according to the present invention may be formed only of ferrite, martensite, bainite, and tempered martensite, as stated above; however, as far as the actions of the invention are not hampered, the steel sheet may include a microstructure (balance microstructure) that is unavoidably generated, for example, in the manufacturing processes, etc. Examples of the balance microstructure include pearlite, residual austenite, etc. The total fraction of the aforementioned balance microstructure based on the whole microstructure is preferably 5% by area or less, more preferably 3% by area or less, and most preferably 0% by area.

Identification of the aforementioned microstructures and measurement of the fractions thereof may be performed in a method shown in the later-described examples.

[Average Crystal Grain Size of Ferrite: 3.0 μm or Less]

In the present invention, in addition to the fact that the fraction of each microstructure meets the aforementioned requirements, the average crystal grain size of ferrite is made to be 3.0 μm or less. Herein, the crystal grain of ferrite means a crystal grain surrounded by high-angle grain boundaries that can be considered to correspond to prior austenite grain boundaries. By fining the crystal grain of ferrite, the strength-ductility balance can be further improved. Because the aforementioned action is more effectively exerted as the average crystal grain size of ferrite becomes smaller, the crystal grain size is made to be 3.0 μm or less, preferably 2.8 μm or less, and more preferably 2.6 μm or less. The lower limit of the crystal grain size is not limited by the relationship with the aforementioned action; however, when a component composition and a manufacturing method according to the invention are taken into consideration, it is preferable that the lower limit is generally 1 μm or more.

The average crystal grain size of ferrite can be measured by a method shown in the later-described examples.

The microstructures of the steel sheet according to the present invention have been described above in detail.

In the present invention, in order to sufficiently exert excellent properties (high-strength, high-yield ratio, and high-workability) by making a steel sheet with the aforementioned microstructure, and also in order to exert other properties such as spot weldability and coated-layer adhesiveness, it is needed to control the chemical component composition of a steel sheet as follows.

Hereinafter, the component composition of the steel sheet will be described in detail.

[C: 0.06% or More to Less Than 0.12%]

C is an element necessary for securing the strength of the steel sheet. If the amount of C is deficient, not only a lot of ferrite is generated, but also bainite and martensite are made soft, and hence it becomes difficult to achieve high-strength. Accordingly, in the present invention, the amount of C is determined to be 0.06% or more. The amount thereof is preferably 0.07% or more, and more preferably 0.080% or more. On the other hand, if C is contained excessively, spot weldability is deteriorated, and hence the upper limit of the amount of C is made to be less than 0.12%. The amount thereof is preferably 0.110% or less, and more preferably 0.100% or less.

[Si: 0.2% or Less]

Si is an element effective in solute strengthening of ferrite, but is also an element by which spot weldability and coated-layer adhesiveness are deteriorated, and hence it is preferable that the amount of Si is as small as possible in the present invention. Accordingly, the upper limit of the amount of Si is made to be 0.2%. The upper limit thereof is preferably 0.15% or less, and more preferably 0.10% or less.

[Mn: 2.0 to 3.5%]

Mn is an element that contributes to securing high-strength by improving hardenability. If the amount of Mn is deficient, an excessive amount of ferrite is generated, and hence it becomes difficult to achieve high-strength and high-yield ratio. Accordingly, Mn is contained in an amount of 2.0% or more in the present invention. The amount thereof is preferably 2.3% or more, and more preferably 2.5% or more. On the other hand, if Mn is contained excessively, the generation amount of ferrite cannot be secured, and hence the strength-ductility balance is deteriorated. In addition, if the amount of Mn becomes too large, spot weldability is likely to be deteriorated. Accordingly, the upper limit of the amount of Mn is made to be 3.5%. The amount thereof is preferably 3.2% or less, and more preferably 2.90% or less.

[At Least One Element Selected From Group Consisting Of Ti, Nb, and V: 0.01 to 0.15% in Total]

Ti, Nb, and V are elements each of which fines the microstructures of ferrite, bainite, and martensite, which are transformation microstructures from austenite, by fining austenite crystal grains that have been generated during heating with a pinning effect due to the precipitation of carbonitrides, thereby contributing to improving strength-ductility balance. Further, by fining the austenite crystal grains, nucleation sites for ferrite transformation are increased, and ferrite transformation can be promoted. These elements may be added alone or in combination of two or more thereof. In order to exert such an effect, the lower limit of the total amount thereof (when one element is contained, the content of the one element, it is the same hereinafter) is made to be 0.01%. The lower limit thereof is made to be preferably 0.02% or more, and more preferably 0.05% or more. However, if the total amount thereof becomes too large, ferrite is generated excessively, and hence it becomes difficult to achieve high-strength and high-yield ratio. In addition, if the total amount thereof becomes too large, deformation resistance is increased during hot-rolling and cold-rolling, thereby causing the disadvantages that: productivity may be decreased; cost is increased; and the aforementioned effect is saturated even when an excessive amount thereof is contained. Taking into consideration the aforementioned disadvantages, the total amount thereof is made to be 0.15% or less. The total amount thereof is preferably 0.12% or less.

[B: 0.0003 to 0.005%]

B is an element that suppresses ferrite/bainite transformation by improving hardenability and secures the generation amount of martensite, thereby contributing to making a steel sheet to have high-strength. Also, B has an action in which generation of ferrite is suppressed and decreases in tensile strength and yield ratio, occurring due to generation of a large amount of ferrite, are suppressed. In order to exert such effects, the amount of B is made to be 0.0003% or more. The amount thereof is preferably 0.0005% or more. However, if the amount of B becomes excessive, hot deformation resistance is increased, and hence productivity may be decreased. In addition, even if B is contained excessively, the effect of improving hardenability, occurring due to the addition of B, is saturated, which leads to a cost increase. Accordingly, the amount of B is made to be 0.005% or less. The amount thereof is preferably 0.0035% or less.

[P: 0.05% or Less]

P is an element effective in solute strengthening of ferrite, but is also an element by which spot weldability and coated-layer adhesiveness are deteriorated, and hence it is preferable that the amount of P is as small as possible. Accordingly, the upper limit of the amount of P is made to be 0.05%. The upper limit thereof is preferably 0.03% or less, and more preferably 0.02% or less. Herein, it is industrially difficult to make the amount of P 0%.

[S: 0.05% or Less]

S is an unavoidable impurity element, and it is preferable that the amount thereof is as small as possible, from the viewpoints of securing workability and spot weldability. Accordingly, the upper limit of the amount of S is made to be 0.05% or less. The upper limit thereof is preferably 0.02% or less, and more preferably 0.01% or less. Although it is preferable that the mount of S is as small as possible, it is industrially difficult to make the amount thereof 0%.

[Al: 0.005 to 0.1%]

Al is an element having a deoxidation action. In order to effectively exert such an action, it is needed to contain Al in an amount of 0.005% or more. The amount of Al is preferably 0.01% or more. However, the effect thereof is saturated even if Al is added excessively, the upper limit of thereof is made to be 0.1%. The upper limit thereof is preferably 0.08% or less, and more preferably 0.06% or less.

[N: 0.015% or Less]

N is an unavoidable impurity element, and has a tendency in which, when a large amount of N is contained, toughness and ductility (elongation) are deteriorated, and hence the upper limit of the amount of N is made to be 0.015%. The upper limit thereof is preferably 0.01% or less, and more preferably 0.005% or less. Although it is preferable that the amount of N is as small as possible, it is industrially difficult to make the amount of N 0%.

The basic components of the steel to be used in the present invention have been described above, and the balance is iron and unavoidable impurities. Examples of the unavoidable impurities, which have been brought into in accordance with the states of raw materials, materials, and manufacturing facilities, etc., include O and Tramp elements (Sn, Zn, Pb, As, Sb, Bi, etc.), etc., in addition to the aforementioned S and N.

The steel to be used in the present invention may further contain the following optional elements (selective components), if necessary.

[At Least One Element Selected from Group Consisting of Cr and Mo: 1.0% or Less in Total (Not Including 0%)]

Each of Cr and Mo is an element that contributes to securing high-strength by improving hardenability. In the present invention, these elements may be added alone or in combination of them. In order to exert such an effect, it is preferable that the lower limit of the total amount (when one element is contained, the amount of the one element, it is the same hereinafter) is 0.04% or more. The lower limit thereof is preferably 0.07% or more, and more preferably 0.10% or more. However, if Cr and Mo are contained excessively, ductility (elongation) is deteriorated, and hence it is preferable to make the upper limit of the total amount thereof 1.0% or less. The total amount thereof is more preferably 0.8% or less, and still more preferably 0.6% or less.

In order to manufacture the steel sheet according to the present invention, it is particularly effective to appropriately control the annealing conditions after cold-rolling. The steel sheet according to the invention can be manufactured by performing, for example, the following steps in the described order. The following steps are: a step of preparing steel having the aforementioned component composition; a soaking step in which, after being hot-rolled and cold-rolled, a steel sheet is held at a temperature within a range of $Ac_3$ Point to ($Ac_3$ Point+150° C.) for 5 to 200 seconds; a step of cooling the steel sheet at an average cooling rate of 3 to 30° C./sec; and a low-temperature holding step of holding the steel sheet at a temperature within a range of (Ms Point−50° C.) to (Ms Point+50° C.) for 15 to 600 seconds. Herein, $Ac_3$ Point means the temperature at which, when the steel sheet is heated, austenite transformation is completed, while Ms Point means the temperature at which martensite transformation is initiated. Hereinafter, a method of manufacturing the aforementioned steel sheet will be sequentially described.

Steel having the aforementioned component composition is first prepared.

Subsequently, the steel is hot-rolled and cold-rolled based on an ordinary method. In the hot-rolling, the finish rolling temperature can be made to be, for example, approximately $Ac_3$ Point or higher, and the coiling temperature can be made to be, for example, approximately 400 to 700° C. After the hot-rolling, the steel sheet is pickled, if necessary, and is then cold-rolled, in which a cold-rolling ratio is, for example, approximately 35 to 80%.

Figure 1:
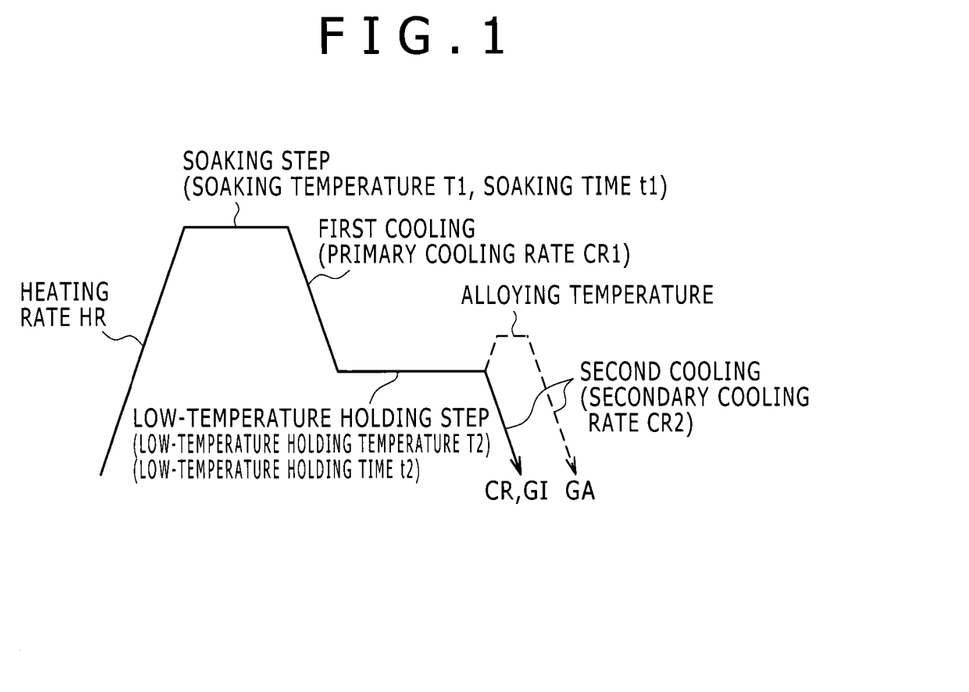
FIG. 1 is a schematic graph showing a heat pattern when a steel sheet according to the present invention is manufactured.
Figure 2:
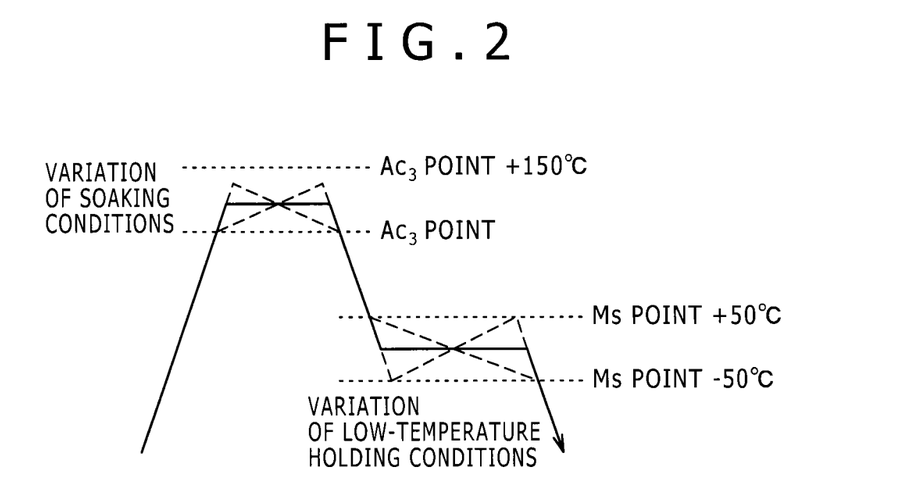
FIG. 2 is a schematic graph showing a variation of the heat pattern when the steel sheet according to the invention is manufactured.

Subsequently, an annealing step after the cold-rolling will be described in detail with reference to FIGS. 1 and 2. FIG. 1 is a graph showing a heat pattern in which each of the aforementioned soaking step and the low-temperature holding step is performed at a constant temperature; and FIG. 2 is a graph showing a heat pattern in which each of the aforementioned soaking step and the low-temperature holding step is performed with a temperature being changed within a range recommended in the present invention.

In the annealing step, the steel sheet is first heated from room temperature to a temperature within a range of $Ac_3$ Point to ($Ac_3$ Point+150° C.). Hereinafter, an arbitrary temperature within this temperature range is sometimes referred to as a soaking temperature T1.

The average heating rate from room temperature to the aforementioned soaking temperature T1 is not particularly limited, but an average heating rate within a commonly-used range, which is appropriately controlled, may be adopted. In the present invention, the steel sheet is heated, from room temperature to the soaking temperature T1, preferably at an average heating rate of 1° C./sec or more, and more preferably at an average heating rate of 2° C./sec or more, taking into consideration productivity, etc. The upper limit of the average heating rate from room temperature to the soaking temperature T1 is not particularly limited, but is, for example, approximately 50° C./sec.

[Soaking Step]

In the soaking step, it is preferable to soak the steel sheet at a temperature within the range of $Ac_3$ Point to ($Ac_3$ Point+150° C.) (soaking temperature T1) for 5 to 200 seconds (hereinafter, sometimes referred to as soaking time t1). If the soaking temperature T1 is lower than $Ac_3$ Point, austenite transformation becomes insufficient and a lot of ferrite remains, and hence the generation amounts of bainite and tempered martensite may not be secured and it becomes difficult to secure a desired microstructure. Accordingly, the soaking temperature T1 is made preferably to be $Ac_3$ Point or higher, and more preferably to be ($Ac_3$ Point+10° C.) or higher. On the other hand, if the soaking temperature T1 is higher than ($Ac_3$ Point+150° C.), the grain growth of austenite is promoted and the microstructure is coarsened, and hence nucleation sites for ferrite transformation may be decreased. Therefore, ferrite transformation is suppressed, the generation amount of ferrite cannot be secured, and hence the strength-ductility balance may be decreased. Accordingly, the soaking temperature T1 is made preferably to be ($Ac_3$ Point+150° C.) or lower, and more preferably to be ($Ac_3$ Point+100° C.) or lower.

If the soaking time t1 is shorter than 5 seconds, austenite transformation becomes insufficient and a lot of ferrite remains, and hence it becomes difficult to secure a desired microstructure, thereby possibly not allowing high-strength and high-yield ratio to be achieved. Accordingly, the soaking time t1 is made preferably to be 5 seconds or longer, and more preferably to be 20 seconds or longer. However, if the soaking time t1 is too long, the grain growth of austenite is promoted and the microstructure is coarsened as stated above, and hence the strength-ductility balance is likely to be decreased. In addition, if the soaking time t1 is too long, productivity is decreased. Accordingly, the soaking time t1 is made preferably to be 200 seconds or shorter, and more preferably to be 150 seconds or shorter.

The soaking temperature T1 is not required to be constant and may be changed as illustrated in FIG. 2, as long as the soaking time t1 at a temperature within the temperature range of $Ac_3$ Point to ($Ac_3$ Point+150° C.) (T1 temperature range) is secured for 5 to 200 seconds. Specifically, for example, as illustrated by the solid line in FIG. 2, after being heated, at once, to a temperature within the temperature range of $Ac_3$ Point to (Ac3 Point+150° C.) (T1 temperature range), the steel sheet may be held isothermally at the temperature for 5 to 200 seconds; alternatively, as illustrated by the dotted lines in FIG. 2, after being heated to a temperature within the temperature range of $Ac_3$ Point to ($Ac_3$ Point+150° C.) (T1 temperature range), the steel sheet may be further heated within this temperature range, or further cooled within this temperature range. In short, aspects, in each of which the soaking time t1 at a temperature within the aforementioned T1 temperature range is secured for a predetermined period of time, are all encompassed by the scope of the present invention, and even in any one of the aspects, desired properties can be achieved.

[Cooling Step]

In the cooling step, it is preferable to cool the steel sheet at an average cooling rate (CR1) of 3 to 30° C./sec from the aforementioned soaking temperature T1 to a temperature within a range of (Ms Point−50° C.) to (Ms Point+50° C.). Hereinafter, an arbitrary temperature within the temperature range of (Ms Point−50° C.) to (Ms Point+50° C.) is sometimes referred to as a low-temperature holding temperature T2. By making the aforementioned average cooling rate CR1 to be, for example, 3° C./sec or more, ferrite can be generated so as to satisfy the aforementioned fraction of ferrite. If the average cooling rate CR1 is less than 3° C./sec, ferrite transformation is advanced and the fraction of ferrite becomes too large, and hence it becomes difficult to secure high-strength and high-yield ratio. The average cooling rate CR1 is more preferably 5° C./sec or more. However, if the average cooling rate CR1 becomes too large, ferrite transformation is hardly generated, and hence it becomes difficult to secure the amount of ferrite. Accordingly, the average cooling rate CR1 is made preferably to be 30° C./sec or less, more preferably to be 25° C./sec or less, and still more preferably to be 20° C./sec or less.

It is not necessarily needed to cool the steel sheet at a constant rate from the aforementioned soaking temperature T1 to a temperature within a temperature range of (Ms Point−50° C.) to (Ms Point+50° C.) (T2 temperature range), and the steel sheet may be cooled in multiple stages. In short, it is only needed that the average cooling rate CR1 within a temperature range of the soaking temperature T1 to the low-temperature holding temperature T2 is within a range of 3 to 30° C./sec. For example, the cooling within the aforementioned temperature range may be performed in two stages, the average cooling rate in one of which is different from that in the other of which, and the cooling rate from the soaking temperature T1 to an intermediate temperature (e.g., 500 to 700° C.) and that from the intermediate temperature to the low-temperature holding temperature T2 may be made different from each other.

[Low-Temperature Holding Step]

In the low-temperature holding step, it is preferable to hold the steel sheet at a temperature within the temperature range of (Ms Point−50° C.) to (Ms Point+50° C.) (T2 temperature range) for 15 to 600 seconds (hereinafter, sometimes referred to as low-temperature holding time t2). By holding the steel sheet within this temperature range for a predetermined period of time, predetermined fractions of bainite and tempered martensite can be secured. If the low-temperature holding temperature T2 is higher than (Ms Point+50° C.), it becomes difficult to generate bainite transformation, and hence the fraction of martensite is increased. Accordingly, the low-temperature holding temperature T2 is made preferably to be (Ms Point+50° C.) or lower, and more preferably to be (Ms Point+40° C.) or lower. However, if the low-temperature holding temperature T2 is lower than (Ms Point−50° C.), the advancement of bainite transformation becomes insufficient and the fraction of martensite is also increased, and hence the strength-ductility balance may be deteriorated. Accordingly, the low-temperature holding temperature. T2 is made preferably to be (Ms Point−50° C.) or higher, and more preferably to be (Ms Point−40° C.) or higher.

If the low-temperature holding temperature t2 is shorter than 15 seconds, bainite transformation is not sufficiently generated and the fraction of martensite is increased, and hence a high-yield ratio may not be achieved and strength-elongation balance may be deteriorated. Accordingly, the low-temperature holding time t2 is made preferably to be 15 seconds or longer, more preferably to be 20 seconds or longer, and still more preferably to be 25 seconds or longer. However, even if the low-temperature holding time t2 is longer than 600 seconds, the bainite transformation is not further advanced and productivity is decreased. Accordingly, the low-temperature holding time t2 is made preferably to be 600 seconds or shorter, more preferably to be 500 seconds or shorter, and still more preferably to be 450 seconds or shorter.

The low-temperature holding temperature T2 is not required to be constant and may be changed as illustrated in FIG. 2, as long as the low-temperature holding temperature at a temperature within the temperature range of (Ms Point−50° C.) to (Ms Point+50° C.) (T2 temperature range) is secured for 15 to 600 seconds, when the steel sheet is cooled from the soaking temperature T1. Specifically, for example, as illustrated by the solid line in FIG. 2, after being cooled, at once, from the soaking temperature T1 to a temperature within the low-temperature holding temperature range T2, the steel sheet may be held isothermally at the temperature; alternatively, as illustrated by the dotted lines in FIG. 2, after being cooled to the temperature within the low-temperature holding temperature T2, the steel sheet may be further cooled within this temperature range, or further heated within this temperature range. In short, aspects, in each of which the low-temperature holding time t2 within the aforementioned T2 temperature range is secured for a predetermined period of time, are all encompassed by the scope of the present invention, and even in any one of the aspects, desired properties can be achieved.

Subsequently, by cooling the steel sheet from the temperature within the temperature range of (Ms Point−50° C.) to (Ms Point+50° C.) (T2 temperature range) to room temperature after the low-temperature holding step, the steel sheet having high-strength (cold-rolled steel sheet) according to the present invention can be manufactured.

The average cooling rate CR2 within a temperature range of the low-temperature holding temperature T2 within the T2 temperature range to room temperature is not particularly limited, but an average cooling rate within a commonly-used range, which is appropriately controlled, may be adopted. In the present invention, it is preferable to cool the steel sheet at an average cooling rate (CR2) of 1° C./sec or more within the aforementioned temperature range. It is because, if the average cooling rate CR2 is less than 1° C./sec, productivity is decreased and martensite becomes soft due to austempering of martensite (self-tempering), thereby causing the fear that TS may be decreased. The average cooling rate CR 2 is more preferably 3° C./sec or more. The upper limit of the average cooling rate CR 2 is not particularly limited, but is preferably made to be, for example, approximately 100° C./sec.

It is good to control the average cooling rate CR 2 within the temperature range of the low-temperature holding temperature T2 within the T2 temperature range to room temperature. This low-temperature holding temperature T2 means, when the steel sheet is cooled or heated within the T2 temperature range, as illustrated by the dotted lines in FIG. 2, a temperature occurring after the cooling or the heating (T2 end temperature).

A hot-dip galvanizing-coated layer or a hot-dip galvannealing-coated layer may be formed on the surface of the steel sheet having high-strength and high-yield ratio (cold-rolled steel sheet) obtained by being cooled to room temperature.

Conditions under which the hot-dip galvanizing-coated layer or the hot-dip galvannealing-coated layer are formed are not particularly limited, but a commonly-used hot-dip galvanizing-coating treatment and further a commonly-used alloying treatment can be adopted. Thereby, the hot-dip galvanizing-coated steel sheet (GI steel sheet) and the hot-dip galvannealing-coated steel sheet (GA steel sheet) according to the present invention can be obtained. Specifically, in the aforementioned FIG. 1, by performing a hot-dip galvanizing-coating treatment and further an alloying treatment during one of the following steps (or between the following steps) such as during the low-temperature holding step, between the low-temperature holding step and the subsequent secondary cooling step, or during the secondary cooling step, a desired coated steel sheet can be obtained.

When a hot-dip galvanizing-coating treatment or an alloying treatment is performed during the low-temperature holding step, it is needed to control such that the total of time of the holding time within the T2 temperature range, which is performed before and after the treatment, becomes 15 to 600 seconds.

The conditions of the hot-dip galvanizing-coating treatment and the alloying treatment are not particularly limited, but commonly-used conditions can be adopted. For example, when a hot-dip galvanizing-coated steel sheet is manufactured, hot-dip galvanizing-coating is performed by dipping the steel sheet in a plating bath whose temperature is adjusted to approximately 430 to 500° C., and then the coated steel sheet is cooled. In addition, when a hot-dip galvannealing-coated steel sheet is manufactured, after the aforementioned hot-dip galvanizing-coating treatment, the coated steel sheet is alloyed after being heated to a temperature within approximately 500 to 750° C. and then cooled.

EXAMPLES

Hereinafter, the present invention will be described in more detail with reference to examples, but the invention should not be limited by the following examples, and the invention can also be practiced by adding modifications within a range in which each of the modifications suits the points before and after thereof, which can be encompassed by the scope of the invention.

Steel having a component composition shown in the following Table 1 (balance is iron and unavoidable impurities) was formed into an ingot and then hot-rolled to a thickness of 2.4 mm. The finish rolling temperature was made to be 880° C. and the coiling temperature was made to be 600° C.

Subsequently, the obtained hot-rolled steel sheet was pickled and then cold-rolled to a thickness of 1.2 mm, thereby allowing a cold-rolled steel sheet to be manufactured (cold-rolling ratio: 50%).

Subsequently, the obtained cold-rolled steel sheet was annealed in the following procedures. That is, after being heated from room temperature (27° C.) to the soaking temperature T1 (° C.) shown in the following Table 2 at an average heating rate HR (° C./sec), the steel sheet was held at the soaking temperature T1 (° C.) for the time t1 (seconds) shown in the following Table 2. After being held, the steel sheet was cooled from the soaking temperature T1 (° C.) to the low-temperature holding start temperature T2 (° C.) at an average cooling rate CR1 (° C./sec). Thereafter, the steel sheet was: held isothermally at the low-temperature holding start temperature T2 (T2 start temperature=T2 end temperature); cooled to the low-temperature holding end temperature T2 (T2 start temperature>T2 end temperature); or heated to the low-temperature holding end temperature T2 (T2 start temperature<T2 end temperature). After being held at the low-temperature, the steel sheet was cooled from the T2 end temperature to room temperature (27° C.) at an average cooling rate CR2 (° C./sec) shown in the following Table 2.

With respect to No. 31 in Table 2, a cold-rolled steel sheet (denoted by CR) was manufactured by performing, in a coating continuous annealing-line, an annealing treatment under the annealing conditions shown in Table 2.

With respect to Nos. 1 to 29 in Table 2, after being subjected, in a coating continuous annealing-line, to an annealing treatment under the annealing conditions shown in Table 2, a hot-dip galvanizing-coated steel sheet (denoted by GI in Table 2) was manufactured by performing hot-dip galvanizing-coating in a plating bath whose temperature was 450° C.

With respect to No. 30 in Table 2, after being subjected, in a coating continuous annealing line, to an annealing treatment under the conditions shown in Table 2, a hot-dip galvannealing-coated steel sheet (denoted by GA in Table 2) was manufactured by performing a hot-dip galvanizing-coating treatment in a plating bath whose temperature was 450° C. and then by performing an alloying treatment at 550° C.

In Table 2, the temperatures at $Ac_3$ Points and Ms Points of the component compositions shown in the following Table 1 are shown, in which the temperatures at $Ac_3$ Points and Ms Points were calculated based on the calculation formulae for an $Ac_3$ Point and an Ms Point that are described in "The Physical Metallurgy of Steels", William C. Leslie, (Shigeyasu Koda, translation supervisor, MARUZEN, 1985, p. 273 ($Ac_3$ Point) or p.231 (Ms Point)). In the following formulae, [ ] indicates the content (% by mass) of each element, and when the element is not contained in the steel, calculation is made, assuming that the element=0% by mass. In Table 2, the values of $Ac_3+150°$ C., Ms−50° C., and Ms+50° C. were also calculated and shown.

$Ac_3$ Point=910−203×$[C]^{1/2}$−15.2×[Ni]+44.7×[Si]+104× [V]+31.5×[Mo]+13.1×[W]0.30×[Mn]−11×[Cr]−20× [Cu]+700×[P]+400×[Al]+120×[As]+400×[Ti]

Ms Point=561−474×[C]−33×[Mn]−17×[Ni]−17×[Cr]−21× [Mo]

With respect to each of the steel sheets (CR, GI, GA) obtained as stated above, the microstructure was observed in the following way and the mechanical properties were measured by performing a tensile test in the following way.

[Microstructure Observation]

In order to observe the t/4 (t: thickness) position in a section of each of the steel sheets (CR, GI, GA), the section being perpendicular to the rolling direction, the microstructure is revealed by etching the steel sheet with natal to observe it with a scanning electron microscope (SEM). Specifically, the area ratios of ferrite and martensite (in the following Table 3, which are abbreviated as VF and VM, respectively) were measured by image analysis using a sectional microstructure photograph whose magnification was determined in accordance with the size of each grain size in the microstructure (any one of magnifications of 1,000, 1,500, and 3,000), and the average of five fields of view was calculated. The field of view was 75 μm×75 μm in the observation magnification of 1,000, 50 μm×50 μm in the observation magnification of 1,500, and 25 μm×25 μm in the observation magnification of 3,000.

Because a balance microstructure was not observed in the present Examples, the total area ratio of bainite and tempered martensite (in the later-described Table 3, which is abbreviated as VB+VTM) was calculated by subtracting the area ratio (VF) of ferrite and that (VM) of martensite, which were measured as stated above, from the whole microstructure (100% by area).

Each of the bainite and the tempered martensite had a microstructure in which carbide was precipitated in ferrite and it was difficult to distinguish, based on a SEM photograph, both the microstructures from each other, and hence the area ratios of both the microstructures were represented as a total area ratio.

The average crystal grain size of ferrite (in the later-described Table 3, which is abbreviated as dF) was measured by an intercept method according to "Methods of ferrite grain size test for steel" specified in JIS G 0552, which was determined as the average grain size of ferrite dF.

Results of these measurements are shown in Table 3.

[Measurement of Mechanical Property]

A JIS Z 2201 No. 5 specimen, the longitudinal direction of which was the rolling direction, was obtained from each of the aforementioned steel sheets (CR, GI, GA) to measure yield-strength (YS), tensile strength (TS), and total elongation (EL) according to JIS Z 2241. From these values, a yield ratio [YR=(YS/TS)×100] and a value of TS×EL were calculated.

In the present Examples, the case where TS was 980 MPa or more was evaluated as high-strength, the case where YR was 68% or more was evaluated as high-yield ratio, and the case where TS×EL was 10.0 GPa·% or more was evaluated as being excellent in a balance between strength and elongation (strength-ductility balance).

The following consideration can be made from Tables 1 to 3. At first, Nos. 1 to 7 and 21 to 31 in Table 3 represent examples in which the steel types A to G and M to T in Table 1, which meet the component composition specified in the present invention, have been manufactured according to the method recommended in the invention, respectively. Each of the examples has good properties in which: tensile strength is 980 MPa or more; a high yield-ratio of 68% or more is exerted; and TS×EL is 10.0 GPa·% or more.

On the other hand, in examples in which any one of the requirements specified in the present invention was not met, desired properties were not obtained. At first, in Nos. 8 to 15 in Table 3, the steel types A, C, and D in Table 1, which respectively met the component composition specified in the present invention, were used; however, the manufacturing conditions did not meet the requirements recommended in the invention, and hence desired properties were not obtained.

Among them, in No. 8 in Table 3, the soaking temperature T1 was too low, and hence ferrite was generated excessively, thereby not allowing desired high-strength and high-yield ratio to be achieved. In addition, because ferrite was generated excessively, the total amount of bainite and tempered martensite became small, thereby not allowing a high-yield ratio to be achieved. On the other hand, in No. 9 in Table 3, the soaking temperature T1 was too high, and hence ferrite was not generated, thereby causing the strength-ductility balance to be decreased.

In No. 10 in Table 3, the soaking time t1 was too short, and hence ferrite was generated excessively, thereby not allowing desired high-strength and high-yield ratio to be achieved. In addition, because ferrite was generated excessively, the total amount of bainite and tempered martensite became small, thereby not allowing a high-yield ratio to be achieved.

In No. 11 in Table 3, the primary cooling rate CR1 after the soaking step was too small, and hence ferrite was generated excessively, thereby not allowing desired high-strength and high-yield ratio to be achieved. In No. 12 in Table 3, the primary cooling rate CR1 after the soaking step was too large, and hence the generation amount of ferrite was impossible to secure, thereby causing the strength-ductility balance to be decreased.

No. 13 in Table 3 represents an example in which the low-temperature holding temperature T2 was too low. In the example, martensite was generated excessively, and hence the strength-ductility balance was decreased. No. 14 in Table 3 represents an example in which the low-temperature holding temperature T2 was too high. In the example, martensite was generated excessively, and hence the strength-ductility balance was decreased. In addition, because ferrite was generated excessively, the total amount of bainite and tempered martensite became small, thereby not allowing a high-yield ratio to be achieved.

In No. 15 in Table 3, because the low-temperature holding time t2 was too short, martensite was generated excessively, thereby causing the strength-ductility balance to be decreased. In addition, because martensite was generated excessively, the total amount of bainite and tempered martensite became small, thereby not allowing a high-yield ratio to be achieved.

No. 16 to 20 in Table 3 respectively represent examples in which steel sheets were manufactured by using steel that did not meet the component composition specified in the present invention, and hence desired properties were not obtained. Among them, in No. 16 in Table 3, the steel type H in Table 1, having a small amount of C, was used, and hence the strength was smaller than 980 MPa. In No. 17 in Table 3, the steel type I in Table 1, having a small amount of Mn, was used, and hence ferrite was generated excessively, thereby not allowing high-strength and high-yield ratio to be achieved.

In No. 18 in Table 3, the steel type J in Table 1, not containing an element selected from the group consisting of Ti, Nb, and V, was used, and hence the average crystal grain size of ferrite became large, thereby causing the strength-ductility balance to be decreased. In No. 19 in Table 3, the steel type K in Table 1, having a large amount of Ti, was used, and hence ferrite was generated excessively, thereby not allowing high-strength and high-yield ratio to be achieved. In No. 20 in Table 3, the steel type L in Table 1, not containing B, was used, and hence ferrite was generated excessively, thereby not allowing high-strength and high-yield ratio to be achieved.

In Nos. 6, 7, 21, and 23 to 29 in Table 3 have high-strength and high-yield ratio, and are excellent in strength-ductility balance, respectively. From these results, it has been confirmed that, even when the temperature during the low-temperature holding step is changed (raised or lowered) within the temperature range recommended in the present invention, desired properties can be achieved.

From the results of the aforementioned examples, it has been confirmed that the steel sheets (CR, GI, GA), which meet the requirements specified in the present invention, combine good properties, respectively.

TABLE 1

| | Component Composition (% by Mass) | | | | | | | | | | | | | |
|---|---|---|---|---|---|---|---|---|---|---|---|---|---|---|
| Steel Type | C | Si | Mn | P | S | Al | N | Cr | Mo | Cr + Mo Total | Ti | Nb | V | Ti + Nb + V Total | B |
| A | 0.094 | 0.02 | 2.62 | 0.005 | 0.001 | 0.04 | 0.003 | — | — | — | 0.06 | — | — | 0.06 | 0.0023 |
| B | 0.080 | 0.01 | 2.61 | 0.009 | 0.001 | 0.04 | 0.004 | 0.20 | 0.12 | 0.32 | 0.08 | — | — | 0.08 | 0.0011 |
| C | 0.112 | 0.05 | 2.16 | 0.004 | 0.001 | 0.03 | 0.003 | — | — | — | 0.06 | — | — | 0.06 | 0.0025 |
| D | 0.064 | 0.03 | 2.94 | 0.010 | 0.003 | 0.05 | 0.003 | — | — | — | 0.07 | — | — | 0.07 | 0.0030 |
| E | 0.095 | 0.02 | 2.61 | 0.007 | 0.001 | 0.04 | 0.003 | — | — | — | 0.03 | — | — | 0.03 | 0.0005 |
| F | 0.080 | 0.04 | 2.69 | 0.003 | 0.002 | 0.03 | 0.004 | — | — | — | 0.05 | 0.05 | — | 0.10 | 0.0027 |
| G | 0.081 | 0.02 | 2.78 | 0.005 | 0.002 | 0.04 | 0.004 | — | — | — | — | — | 0.10 | 0.10 | 0.0025 |
| H | 0.054 | 0.01 | 2.95 | 0.011 | 0.001 | 0.03 | 0.004 | — | — | — | 0.06 | — | — | 0.06 | 0.0026 |
| I | 0.105 | 0.01 | 1.89 | 0.005 | 0.002 | 0.03 | 0.004 | — | — | — | 0.05 | — | — | 0.05 | 0.0032 |
| J | 0.096 | 0.02 | 2.15 | 0.006 | 0.003 | 0.05 | 0.005 | — | — | — | — | — | — | — | 0.0038 |
| K | 0.094 | 0.02 | 2.62 | 0.005 | 0.001 | 0.04 | 0.003 | — | — | — | 0.16 | — | — | 0.16 | 0.0020 |
| L | 0.095 | 0.03 | 2.79 | 0.004 | 0.002 | 0.04 | 0.004 | — | — | — | 0.05 | — | — | 0.05 | — |
| M | 0.091 | 0.05 | 2.20 | 0.015 | 0.001 | 0.04 | 0.003 | 0.60 | — | 0.60 | 0.09 | — | — | 0.09 | 0.0019 |
| N | 0.090 | 0.03 | 2.31 | 0.014 | 0.002 | 0.03 | 0.004 | — | 0.35 | 0.35 | 0.06 | — | — | 0.06 | 0.0021 |
| O | 0.075 | 0.02 | 2.24 | 0.005 | 0.001 | 0.05 | 0.004 | 0.30 | 0.20 | 0.50 | 0.07 | — | — | 0.07 | 0.0016 |
| P | 0.105 | 0.02 | 2.98 | 0.006 | 0.001 | 0.03 | 0.003 | — | — | — | 0.13 | — | — | 0.13 | 0.0018 |
| Q | 0.104 | 0.07 | 2.61 | 0.005 | 0.002 | 0.04 | 0.003 | — | — | — | — | 0.06 | — | 0.06 | 0.0033 |
| R | 0.081 | 0.04 | 3.01 | 0.008 | 0.002 | 0.05 | 0.004 | — | — | — | 0.05 | — | 0.05 | 0.10 | 0.0020 |
| S | 0.090 | 0.06 | 2.89 | 0.006 | 0.001 | 0.04 | 0.004 | — | — | — | 0.03 | 0.03 | 0.05 | 0.11 | 0.0035 |
| T | 0.085 | 0.12 | 2.56 | 0.005 | 0.002 | 0.04 | 0.003 | — | — | — | 0.07 | — | — | 0.07 | 0.0025 |

TABLE 2

| No. | Steel Type | $Ac_3$ Point (°C.) | $Ac_3$ Point +150 (°C.) | Ms Point (°C.) | Ms Point −50 (°C.) | Ms Point +50 (°C.) | Heating Rate HR (°C./Sec) | Soaking Conditions T1 (°C.) | | Primary Cooling Rate CR1 (°C./Sec) | Low-Temperature Holding | | | Secondary Cooling Rate CR2 (°C./Sec) | Abbreviation |
|---|---|---|---|---|---|---|---|---|---|---|---|---|---|---|---|
| | | | | | | | | | t1 (Sec) | | T2 Start Temperature (°C.) | T2 End Temperature (°C.) | t2 (Sec) | | |
| 1 | A | 814 | 964 | 430 | 380 | 480 | 8 | 840 | 50 | 8 | 410 | 410 | 40 | 6 | GI |
| 2 | B | 829 | 979 | 431 | 381 | 481 | 10 | 850 | 40 | 10 | 420 | 420 | 40 | 8 | GI |
| 3 | C | 818 | 968 | 437 | 387 | 487 | 12 | 850 | 30 | 15 | 460 | 460 | 30 | 10 | GI |
| 4 | D | 826 | 976 | 434 | 384 | 484 | 8 | 850 | 50 | 6 | 390 | 390 | 40 | 6 | GI |
| 5 | E | 803 | 953 | 430 | 380 | 480 | 8 | 820 | 40 | 8 | 430 | 430 | 40 | 6 | GI |
| 6 | F | 808 | 958 | 434 | 384 | 484 | 8 | 840 | 50 | 8 | 440 | 400 | 40 | 6 | GI |

TABLE 2-continued

| No. | Steel Type | Ac₃ Point (°C.) | Ac₃ Point +150 (°C.) | Ms Point (°C.) | Ms Point −50 (°C.) | Ms Point +50 (°C.) | Heating Rate HR (°C./Sec) | Soaking Conditions T1 (°C.) | Soaking Conditions t1 (Sec) | Primary Cooling Rate CR1 (°C./Sec) | Low-Temperature Holding T2 Start Temperature (°C.) | Low-Temperature Holding T2 End Temperature (°C.) | Low-Temperature Holding t2 (Sec) | Secondary Cooling Rate CR2 (°C./Sec) | Abbreviation |
|---|---|---|---|---|---|---|---|---|---|---|---|---|---|---|---|
| 7 | G | 800 | 950 | 431 | 381 | 481 | 8 | 840 | 50 | 8 | 440 | 400 | 40 | 6 | GI |
| 8 | A | 814 | 964 | 430 | 380 | 480 | 10 | 770 | 50 | 12 | 410 | 410 | 40 | 8 | GI |
| 9 | A | 814 | 964 | 430 | 380 | 480 | 8 | 1000 | 50 | 8 | 410 | 410 | 40 | 6 | GI |
| 10 | A | 814 | 964 | 430 | 380 | 480 | 8 | 840 | 3 | 8 | 410 | 410 | 40 | 6 | GI |
| 11 | D | 826 | 976 | 434 | 384 | 484 | 6 | 850 | 50 | 2 | 390 | 390 | 40 | 6 | GI |
| 12 | C | 818 | 968 | 437 | 387 | 487 | 12 | 850 | 50 | 35 | 460 | 460 | 40 | 10 | GI |
| 13 | A | 814 | 964 | 430 | 380 | 480 | 10 | 840 | 50 | 10 | 360 | 360 | 40 | 8 | GI |
| 14 | A | 814 | 964 | 430 | 380 | 480 | 8 | 840 | 50 | 8 | 500 | 500 | 40 | 7 | GI |
| 15 | A | 814 | 964 | 430 | 380 | 480 | 7 | 840 | 50 | 6 | 410 | 410 | 10 | 7 | GI |
| 16 | H | 818 | 968 | 438 | 388 | 488 | 8 | 850 | 50 | 8 | 410 | 410 | 40 | 8 | GI |
| 17 | I | 823 | 973 | 449 | 399 | 499 | 10 | 850 | 50 | 12 | 410 | 410 | 30 | 9 | GI |
| 18 | J | 808 | 958 | 445 | 395 | 495 | 6 | 840 | 50 | 6 | 410 | 410 | 40 | 6 | GI |
| 19 | K | 854 | 1004 | 430 | 380 | 480 | 8 | 870 | 40 | 8 | 410 | 410 | 40 | 6 | GI |
| 20 | L | 804 | 954 | 424 | 374 | 474 | 10 | 840 | 50 | 12 | 410 | 410 | 30 | 8 | GI |
| 21 | M | 830 | 980 | 430 | 380 | 480 | 8 | 870 | 50 | 6 | 450 | 410 | 40 | 6 | GI |
| 22 | N | 832 | 982 | 431 | 381 | 481 | 10 | 880 | 40 | 8 | 430 | 430 | 30 | 8 | GI |
| 23 | O | 843 | 993 | 442 | 392 | 492 | 8 | 880 | 45 | 8 | 440 | 400 | 40 | 6 | GI |
| 24 | P | 822 | 972 | 413 | 363 | 463 | 10 | 900 | 40 | 15 | 450 | 390 | 30 | 8 | GI |
| 25 | Q | 786 | 936 | 426 | 376 | 476 | 8 | 850 | 50 | 6 | 460 | 420 | 50 | 6 | GI |
| 26 | R | 814 | 964 | 423 | 373 | 473 | 8 | 860 | 45 | 12 | 440 | 400 | 30 | 6 | GI |
| 27 | S | 806 | 956 | 423 | 373 | 473 | 10 | 830 | 40 | 12 | 440 | 400 | 30 | 10 | GI |
| 28 | T | 827 | 977 | 436 | 386 | 486 | 8 | 880 | 40 | 10 | 460 | 420 | 40 | 6 | GI |
| 29 | T | 827 | 977 | 436 | 386 | 486 | 8 | 860 | 50 | 8 | 400 | 440 | 50 | 8 | GI |
| 30 | T | 827 | 977 | 436 | 386 | 486 | 6 | 900 | 60 | 10 | 410 | 410 | 60 | 6 | GA |
| 31 | T | 827 | 977 | 436 | 386 | 486 | 4 | 850 | 120 | 10 | 410 | 410 | 450 | 5 | CR |

TABLE 3

| No. | Steel Type | Microstructure (% by Area) VF | Microstructure (% by Area) VM | Microstructure (% by Area) VB + VTM | dF (μm) | YS (MPa) | TS (MPa) | YR (%) | EL (%) | TS × EL (GPa · %) |
|---|---|---|---|---|---|---|---|---|---|---|
| 1 | A | 9 | 37 | 54 | 1.9 | 741 | 1041 | 71.2 | 12.3 | 12.8 |
| 2 | B | 11 | 42 | 47 | 2.4 | 759 | 1021 | 74.3 | 11.6 | 11.8 |
| 3 | C | 13 | 50 | 37 | 2.3 | 701 | 1008 | 69.5 | 12.0 | 12.1 |
| 4 | D | 7 | 47 | 46 | 2.1 | 777 | 1033 | 75.2 | 10.8 | 11.2 |
| 5 | E | 10 | 31 | 59 | 2.6 | 772 | 1012 | 76.3 | 10.6 | 10.7 |
| 6 | F | 12 | 38 | 50 | 1.4 | 729 | 1048 | 69.6 | 12.8 | 13.4 |
| 7 | G | 8 | 40 | 52 | 1.6 | 743 | 1059 | 70.2 | 12.6 | 13.3 |
| 8 | A | 25 | 48 | 27 | 2.6 | 605 | 932 | 64.9 | 14.5 | 13.5 |
| 9 | A | 0 | 29 | 71 | — | 831 | 1051 | 79.1 | 8.2 | 8.6 |
| 10 | A | 29 | 52 | 19 | 2.4 | 587 | 918 | 63.9 | 14.2 | 13.0 |
| 11 | D | 18 | 39 | 43 | 2.5 | 612 | 942 | 65.0 | 14.4 | 13.6 |
| 12 | C | 3 | 34 | 63 | 1.4 | 788 | 1070 | 73.6 | 9.1 | 9.7 |
| 13 | A | 7 | 58 | 35 | 1.8 | 831 | 1077 | 77.2 | 8.3 | 8.9 |
| 14 | A | 10 | 66 | 24 | 2.1 | 722 | 1099 | 65.7 | 8.5 | 9.3 |
| 15 | A | 12 | 71 | 17 | 2.2 | 741 | 1121 | 66.1 | 8.6 | 9.6 |
| 16 | H | 14 | 41 | 45 | 2.4 | 679 | 954 | 71.2 | 12.9 | 12.3 |
| 17 | I | 20 | 27 | 53 | 2.7 | 623 | 955 | 65.2 | 14.1 | 13.5 |
| 18 | J | 9 | 34 | 57 | 3.3 | 733 | 1047 | 70.0 | 9.1 | 9.5 |
| 19 | K | 21 | 45 | 34 | 1.7 | 638 | 966 | 66.0 | 14.3 | 13.8 |
| 20 | L | 31 | 30 | 39 | 2.6 | 595 | 911 | 65.3 | 14.6 | 13.3 |
| 21 | M | 8 | 42 | 50 | 2.5 | 732 | 1030 | 71.1 | 11.4 | 11.7 |
| 22 | N | 9 | 40 | 51 | 2.1 | 760 | 1057 | 71.9 | 11.6 | 12.3 |
| 23 | O | 10 | 48 | 42 | 2.3 | 701 | 998 | 70.2 | 10.9 | 10.9 |
| 24 | P | 9 | 36 | 55 | 1.7 | 860 | 1104 | 77.9 | 11.2 | 12.4 |
| 25 | Q | 11 | 42 | 47 | 1.9 | 839 | 1121 | 74.8 | 10.3 | 11.5 |
| 26 | R | 13 | 44 | 43 | 2.0 | 751 | 1050 | 71.5 | 12.0 | 12.6 |
| 27 | S | 12 | 37 | 51 | 1.6 | 715 | 1025 | 69.8 | 12.7 | 13.0 |
| 28 | T | 10 | 45 | 45 | 2.3 | 751 | 1046 | 71.8 | 11.1 | 11.6 |
| 29 | T | 12 | 40 | 48 | 2.6 | 760 | 1024 | 74.2 | 11.5 | 11.8 |
| 30 | T | 7 | 38 | 55 | 2.2 | 781 | 1019 | 76.6 | 10.6 | 10.8 |
| 31 | T | 8 | 29 | 63 | 2.1 | 805 | 1012 | 79.5 | 11.3 | 11.4 |

VF: Ferrite, VM: Martensite, VTM: Tempered Martensite

What is claimed is:

1. A steel sheet comprising:
C of 0.06 mass % or more to 0.112 mass % or less;
Si of 0.2 mass % or less;
Mn of 2.0 to 3.5 mass %;
at least one element selected from the group consisting of Ti, Nb, and V of 0.01 to 0.15 mass % in total;
B of 0.0003 to 0.005 mass %;
P of 0.05 mass % or less;
S of 0.05 mass % or less;
Al of 0.005 to 0.1 mass %;
N of 0.015 mass % or less; and
the balance being iron and unavoidable impurities,
wherein a microstructure of the steel sheet contains ferrite, martensite, bainite, and tempered martensite,
wherein a content of ferrite is more than 5 area % to 15 area % or less, a content of martensite is 31 to 55 area %, and a total content of bainite and tempered martensite is 30 area % or more to less than 70 area %, based on the whole microstructure,
wherein an average crystal grain size of the ferrite is 3.0 μm or less, and
wherein a tensile strength is 980 MPa or more.

2. The steel sheet according to claim 1, further comprising, as another element, at least one element selected from the group consisting of Cr and Mo of 1.0 mass % or less in total, excluding 0 mass %.

3. The steel sheet according to claim 1, having a hot-dip galvanizing-coated layer or a hot-dip galvannealing-coated layer on a surface of the steel sheet.

4. The steel sheet according to claim 1, wherein the amount of C is 0.06 mass % or more to 0.110 mass % or less.

5. The steel sheet according to claim 1, wherein the amount of C is 0.06 mass % or more to 0.100 mass % or less.

6. The steel sheet according to claim 1, wherein the content of martensite is 36 to 55 area %.

7. The steel sheet according to claim 1, wherein the content of martensite is 40 to 55 area %.

8. The steel sheet according to claim 2, having a hot-dip galvanizing-coated layer or a hot-dip galvannealing-coated layer on a surface of the steel sheet.

9. A steel sheet consisting of:
C of 0.06 mass % or more to less than 0.112 mass %;
Si of 0.2 mass % or less;
Mn of 2.0 to 3.5 mass %;
at least one element selected from the group consisting of Ti, Nb, and V of 0.01 to 0.15 mass % in total;
B of 0.0003 to 0.005 mass %;
optionally at least one element selected from the group consisting of Cr and Mo of 1.0 mass % or less;
P of 0.05 mass % or less;
S of 0.05 mass % or less;
Al of 0.005 to 0.1 mass %;
N of 0.015 mass % or less; and
the balance being iron and unavoidable impurities,
wherein a microstructure of the steel sheet contains ferrite, martensite, bainite, and tempered martensite,
wherein a content of ferrite is more than 5 area % to 15 area % or less, a content of martensite is 31 to 55 area %, and a total content of bainite and tempered martensite is 30 area % or more to less than 70 area %, based on the whole microstructure,
wherein an average crystal grain size of the ferrite is 3.0 μm or less, and
wherein a tensile strength is 980 MPa or more.

10. The steel sheet according to claim 9, wherein the amount of C is 0.06 mass % or more to 0.110 mass % or less.

11. The steel sheet according to claim 9, wherein the amount of C is 0.06 mass % or more to 0.100 mass % or less.